United States Patent Office 3,066,132
Patented Nov. 27, 1962

3,066,132
PROCESS AND CATALYST FOR PRODUCTION OF OLEFIN POLYMERS
James T. Edmonds, Jr., Bartlesville, Okla., assignor to Phillips Petroleum Company, a corporation of Delaware
No Drawing. Original application July 11, 1955, Ser. No. 521,367. Divided and this application Dec. 29, 1958, Ser. No. 783,113
12 Claims. (Cl. 260—94.9)

This invention relates to the polymerization of olefins. In one aspect, this invention relates to an improved method for polymerizing olefins and to a novel catalyst therefor.

This application is a division of copending U.S. patent application Serial No. 521,367, filed on July 11, 1955.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. However, it is often desirable to produce higher molecular weight polymers which have desirable properties of heat stability and can be molded into vessels, pipes and tubing. Such uses cannot be made of the lower molecular weight polymers, for example, a polymer having a molecular weight of about 2000, since a polymer of this molecular weight is a wax-like material.

An object of this invention, therefore, is to provide an improved process for the production of olefin polymers. A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising a derivative of a metal of Group IV–A of the Periodic Table (Mendeleeff's Periodic System), including titanium, zirconium, hafnium and thorium, selected from the group consisting of (1) compounds corresponding to the formula $X_nM(OR)_m$, (2) compounds corresponding to the formula $M_a[(OCH_2CH_2)_aNH_{(3-a)}]_b$, (3) salts of monobasic organic acids and a Group IV–A metal, and (4) complex salts of dibasic organic acids and at least one Group IV–A metal and at least one selected from the group consisting of alkali metals and ammonia, wherein X is a halogen, and M is a Group IV–A metal, R is selected from the group consisting of R″ and R‴, where R″ is selected from the group consisting of saturated acyclic (alkyl), monoolefinic acyclic (alkenyl), saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, arylalkenyl, cycloalkylalkenyl, cycloalkylalkyl, alkenylaryl, and alkenylcycloalkyl. R‴ is selected from the group consisting of (a) R″ radicals which are halogen substituted, (b) R″ radicals which contain oxygen, and (c) R″ radicals which are halogen substituted and contain oxygen, said oxygen being present in the form of an ether linkage. Each R contains not more than 20 carbon atoms, preferably less than 10 carbon atoms, with the total carbon atoms in the compound not exceeding 50, $m$ and $n$ are whole numbers, with $m$ being at least 1 and not greater than the valence of the Group IV–A metal and with the sum of $m$ and $n$ being equal to the valence of the Group IV–A metal, $a$ is an integer from 1 to 3, inclusive, and $b$ is equal to the valence of the Group IV–A metal and at least one component selected from the following: (a) a mixture of an organic halide and at least one metal selected from the group consisting of sodium, potassium, lithium, rubidium, cesium, beryllium, magnesium, zinc, cadmium, mercury, aluminum, gallium, indium, and thallium; and (b) a mixture of aluminum chloride and at least one metal selected from the group consisting of sodium, potassium, lithium, rubidium, cesium, beryllium, magnesium, zinc, cadmium, mercury, aluminum, gallium, indium and thallium. As indicated, the catalyst composition of this invention comprises a derivative of a Group IV–A metal as described hereinabove together with mixtures of components (a) and (b) as well as of mixtures of the aforementioned derivatives and any one or two of components (a) or (b). The improvement obtained when polymerizing an olefin in the presence of my catalyst system is, firstly, that polymers of much higher molecular weight can be obtained than is true when certain of the prior art catalysts have been employed, and, secondly, the polymerization reaction, particularly for ethylene, can be initiated and carried out at considerably lower temperatures and pressures than are necessary when employing the catalysts and the processes of the prior art.

The Group IV–A metal derivative component of my catalyst system comprises at least one compound selected from the group consisting of salts of monobasic organic acids and a Group IV–A metal, complex salts of dibasic organic acids and at least one Group IV–A metal and at least one member selected from the group consisting of alkali metals and ammonia, complex compounds of a Group IV–A metal corresponding to the formula

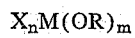

and complex compounds of a Group IV–A metal corresponding to the formula $M_a[(OCH_2CH_2)_aNH_{(3-a)}]_b$, wherein X is a halogen, wherein M is a metal selected from the group consisting of titanium, zirconium, hafnium and thorium, wherein R is selected from the group consisting of R″ and R‴, where R″ is selected from the group consisting of saturated acyclic (alkyl), monoolefinic acyclic (alkenyl), saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, arylalkenyl, cycloalkylalkenyl, cycloalkylalkyl, alkenylaryl, and alkenylcycloalkyl. R‴ is selected from the group consisting of (a) R″ radicals which are halogen substituted, (b) R″ radicals which contain oxygen, and (c) R″ radicals which are halogen substituted and contain oxygen, said oxygen being present in the form of an ether linkage, wherein $m$ and $n$ are whole numbers, with $m$ being at least 1 and not greater than the valence of the metal and with the sum of $m$ and $n$ being equal to the valence of M, and wherein $a$ is an integer from 1 to 3, inclusive, and $b$ is equal to the valence of M. Each R contains not more than 20 carbon atoms, preferably less than 10 carbon atoms, with the total number of carbon atoms in the complex compound not exceeding 50. The expression "Group IV–A metal" as used herein is intended to include titanium, zirconium, hafnium and thorium. X and the halogen contained in the R radical can be any of the halogens, including bromine, chlorine, fluorine and iodine. Mixtures of any two or more of these derivatives can be used in the practice of my invention. Salts of monobasic organic acids and a Group IV–A metal which can be used include such compounds as titanium acetate, zirconium propionate, titanium butyrate, and the like. Complex salts of dibasic organic acids and at least one Group IV–A metal and at least one of the group consisting of alkali metals and ammonia can also be advantageously employed in my catalyst system. Examples of such compounds are sodium titanium malonate (Na$_2$TiO(C$_3$H$_2$O$_4$)$_2$)

potassium titanium oxalate (the complex salt of oxalic acid and titanium and potassium (K$_2$TiO(C$_2$O$_4$)$_2$), and the like. Of the latter group of compounds potassium titanium oxalate is the compound which is preferred for use in the catalyst system of my invention. Although numerous derivatives fall within the scope of the class of complex compounds corresponding to the formula X$_n$M(OR)$_m$, the preferred derivatives include titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl)titanate, tetra-m-tolyl titanate, tetraalkyl titanate, tetracyclohexenyl titanate, tetracyclopentyl titanate, tetraethyl zirconate, tetramethyl zirconate, tetraisopropyl zirconate, tetraamyl zirconate, dichloro diethyl titanate (Cl$_2$Ti(OC$_2$H$_5$)$_2$), monochloro triethyl titanate (ClTi(OC$_2$H$_5$)$_3$), and dichloro diethyl zirconate (Cl$_2$Zr(OC$_2$H$_5$)$_2$). Also included are such compounds as Hf(OCH$_3$)$_4$, Th(OC$_3$H$_7$)$_4$, Th(OC$_6$H$_5$)$_4$, Cl$_3$Ti(OC$_6$H$_4$CH$_3$), Zr(OC$_4$H$_7$)$_4$, Cl$_2$Hf(OC$_{10}$H$_{21}$)$_2$ Th(OC$_6$H$_{13}$)$_4$, and Zr(OC$_{12}$H$_{25}$)$_4$. Of the complex compounds listed in the above group, titanium butoxide (Ti(OC$_4$H$_9$)$_4$) is preferred for use in my catalyst system since the use of this material as a catalyst in the polymerization of ethylene provides a high molecular weight, extremely flexible and tough polymer which can be molded into a variety of shapes and forms. This ethylene polymer does not have a tendency to become discolored on injection or extrusion molding and is, therefore, useful in a large variety of applications. The surface of the molded articles formed from a polyethylene prepared in the presence of the preferred catalyst titanium butoxide is very smooth and pleasing to the touch. Examples of complex compounds corresponding to the formula M$_a$[(OCH$_2$CH$_2$)$_a$NH$_{(3-a)}$]$_b$ which can be employed in my catalyst system include monoethanolamine titanate, diethanolamine titanate, triethanolamine titanate, monoethalonamine zirconate, diethanolamine zirconate, triethanolamine zirconate, monoethanolamine thoriate, and the like. Of this latter group of compounds, it is preferred to use triethanolamine titanate in the catalyst system of our invention. The Group IV–A metal derivatives listed hereinabove are preferably employed in the anhydrous or substantially anhydrous form.

In admixture with one or more of the Group IV–A metal derivatives described above, my novel catalyst system comprises a mixture of an organic halide and a free or elemental metal. These organic halides include chloro-, bromo-, iodo- and fluoro-substituted organic halides, and can be mono-, di-, tri- or tetra-substituted organic halides. Within the broad class of organic halides which is a component of my novel catalyst composition, the class of halides defined as monohalogen-substituted hydrocarbons having a maximum carbon chain length of not greater than 8 carbon atoms are preferred since they are more easily handled in a commercial operation and are active to initiate the polymerization of olefins in the catalyst composition of this invention. Still more desirably, the organic halide which is used in the catalyst is a lower alkyl monohalide having a maximum carbon chain length of not greater than 8 carbon atoms. Examples of these organic halides which can be used in the catalyst are ethyl bromide, propyl chloride, butyl iodide and pentyl fluoride. Other examples are 1,2-dibromoethane, 1,3-dibromopropane, 1,2,3-tribromopropane, 1,2 3-trichloropropane, 1,1-difluoroethane, and 1,4-diiodobutane. Other acyclic and cyclic halides as well as aromatic halides can be employed also. Examples of these are 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1 - chloro - 3 - phenylpropane, 1 - bromo - 3 - phenylhexane, cyclohexyl chloride and phenyl chloride. Also alkenyl halides, such as allyl bromide, and alkynyl halides, such as propargyl chloride, can be used. The metals which are employed in admixture with an organic halide include one or more of sodium, potassium, lithium, rubidium, cesium, beryllium, magnesium, zinc, cadmium, mercury, aluminum, gallium, indium, and thallium. The metals are usually used in the form of shavings, turnings or finely divided powder. Various mixtures or combinations of the above-mentioned organic halides and metals can be employed in the catalyst composition of this invention.

Alternatively, or in addition to the mixture of an organic halide and a free or elemental metal, as set forth above, my catalyst system comprises a mixture of one or more of the Group IV–A metal derivatives described above and a mixture of aluminum chloride and a free or elemental metal. The metals which are employed in admixture with aluminum chloride include or or more of sodium, potassium, lithium, rubidium, cesium, beryllium, magnesium, zinc, cadmium, mercury, aluminum, gallium, indium and thallium. The metals are usually used in the form of shavings, turnings or finely divided powder. When utilizing aluminum chloride in my catalyst system, it has been found to be necessary to include the free or elemental metal as indicated, for with a catalyst system employing aluminum chloride alone with a Group IV–A metal derivative no appreciable amount of polymer is formed.

As has been indicated, all possible combinations of a mixture of an organic halide and a free or elemental metal as set forth above and/or a mixture of aluminum chloride and a free or elemental metal as set forth above together with one or more of the Group IV–A metal derivatives described above are used in the catalyst composition of this invention. The catalyst compositions falling within the scope of this disclosure which are preferred because their use to catalyze the polymerization of olefins provides relatively high molecular weight polymers and/or permits the use of relatively low reaction temperatures and pressures are the following: A mixture of titanium butoxide, aluminum chloride and aluminum; a mixture of titanium butoxide, ethyl bromide and free or elemental aluminum; a mixture of titanium butoxide, aluminum chloride and free or elemental sodium; and a mixture of potassium titanium oxalate, aluminum chloride and free or elemental aluminum.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amounts of organic halide, metal and Group IV–A metal derivatives will be in the range of 0.02 to 50 mols of the organic halide per mol of Group IV–A derivative and from 0.02 to 50 mols of the metal per mol of Group IV–A metal derivative. A preferred ratio is from 0.1 to 5 mols of alkyl halide per mol of Group IV–A metal derivative and from 0.1 to 5 mols of metal per mol of the Group IV–A metal derivative. The ratio of the amounts of aluminum chloride, metal and Group IV-A metal derivative will be in the range of 0.02 to 50 mols of aluminum chloride per mol of Group IV-A metal derivative and from 0.02 to 50 mols of the metal per mol of Group IV-A metal derivative. A preferred ratio is from 0.1 to 5 mols of aluminum chloride per mol of Group IV-A metal derivative and from 0.1 to 5 mols of metal per mol of the Group IV-A metal derivative.

The materials which are polymerized in accordance with this invention are polymerizable hydrocarbons, broadly. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butane, 1-hexene and 1-octene. Branched chain olefins can also be used, such as isobutylene. Also, 1,1-dialkyl-substituted and 1,2-dialkyl substituted ethylenes can be used, such as butene-2, pentene-2, hexene-2, heptene-3, 2-methyl-butene-1, 2-methyl-hexene-1, 2-ethyl-heptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hyrocarbons can be polymerized to a solid polymer in the presence of my novel catalyst as, for example, by copolymerizing ethylene and propylene, ethylene and 1-butene, ethylene and 1-hexene, propylene and 1-butene, or propylene and a pentene. Also, aryl olefins, e.g., styrene and alkyl-substituted styrenes can be polymerized to a solid polymer in the process of this invention.

One of the important advantages obtained in the polymerization of olefins in the presence of my novel catalyst is that lower temperatures and pressures can be used than in certain of the prior art processes. The temperature can be varied over a rather broad range, however, such as from zero to 500° F. The preferred temperature range is from 100 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, halogenated paraffins, cycloparaffins and/or aromatic hydrocarbons which are relatively inert, non-deleterious and liquid under the conditions of the process. The lower molecular weight alkanes, such as propane, butane, and pentane can be used as well as the higher molecular weight paraffins and cycloparaffins, such as isooctane, cyclohexane and methylcyclohexane. Halogenated aromatics, such as chlorobenzene, and aromatic diluents can also be used, such as benzene, toluene, and the like, particularly when operating at higher temperatures. Mixtures of any two or more of these diluents can also be used.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic mono-olefins, within the preferred temperature range of 100 to 350° F., falls within the range of one second to an hour or more. In the batch process, the time for the reaction can vary widely also, such as up to 24 hours or more.

Various materials are known to be poisons for the catalyst composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable also that air and moisture be removed from the reaction vessel before the reaction is carried out.

At the completion of the polymerization reaction, when a batch process is used, the reactor is cooled to about room temperature, any excess olefin is vented, and the contents of the reactor, including the solid polymer swollen with diluent, is removed from the reactor. The total reactor effluent is then treated to inactivate the catalyst, as by washing with an alcohol. The alcohol-washing step is preferably carried out in a comminution zone, such as a Waring Blendor, so that a finely-divided polymer is thereby provided. The polymer is then separated from the alcohol and diluent by decantation or filtration after which the polymer is dried. When the process of the invention is carried out continuously, the total effluent from the reactor, including polymer, diluent and catalyst system is pumped from the reactor as a slurry to a catalyst-inactivating zone where the reactor effluent is cooled and contacted with a suitable catalyst-inactivating material, such as an alcohol. As in the batch process, it is desirable that the alcohol-treatment step be carried out in a comminution zone so that a finely divided polymer is thereby produced. The diluent and alcohol are then separated from the polymer, for example by filtration and the polymer is then dried. The diluent and alcohol can be separated, for example by fractional distillation, and reused in the process.

EXAMPLE I

Ethylene was polymerized in a 1200 cubic centimeter stainless steel rocking autoclave in the presence of a catalyst consisting of 1.7 grams of titanium butoxide and a mixture of 1.3 grams of anhydrous aluminum chloride and 1.04 grams of aluminum powder. The autoclave was charged with 400 milliliters of cyclohexane (dried over sodium and distilled) prior to the addition of catalyst components. The reactor was flushed with dry nitrogen prior to and during the charging procedure to prevent contact of the catalyst with air or moisture. The ethylene was passed through a purification system to remove oxygen, carbon dioxide and water vapor prior to entering the reactor. The purification system comprised a pyrogallol solution, a sodium hydroxide solution and drying agents.

Ethylene was added to the reactor containing the catalyst and cyclohexane until a pressure of 200 p.s.i.g. was reached. The reactor was then heated to 385° F. over a period of 3 hours and 45 minutes and was maintained at a temperature between 385 and 390° F. for 3 hours and 30 minutes, at which time a mild exothermic reaction occurred which lasted for two hours and 10 minutes. After an additional 11 hours and 45 minutes during which period the reactor was maintained between 370 and 385° F., the reactor was repressured with ethylene so as to raise the pressure from 200 to 600 p.s.i.g. An immediate mild exothermic reaction was observed indicating that the catalyst system was still active. The solid polymer removed from the reactor was stirred for fifteen minutes with 400 milliliters of isopropyl alcohol in a Waring Blendor and then filtered to recover the solid polymer. The recovered polymer was washed in the Waring Blendor with 200 milliliters of water and 2 grams of sodium hydroxide, filtered and then dried for 12 hours at 85° C. at 30 inches mercury vacuum. Approximately 23 grams of dry polymer was obtained.

The properties of a compression mold sample of this ethylene polymer are listed in Table I.

Table I

| | |
|---|---|
| Inherent viscosity | 2.776. |
| Molecular weight based on inherent viscosity | Approx. 67,875. |
| Melting point | 251±2° F. |

*Note.*—Polymer was hard to dissolve. Gel visible in solution after 4 hours in 130° F. bath.

EXAMPLE II

Ethylene was polymerized in the same equipment and using the same general procedure as described in Example I. In this run the catalyst consisted of 3.0 grams of titanium butoxide and a mixture of 7.1 grams of ethyl bromide and 3.0 grams of aluminum powder. About 400 milliliters of cyclohexane (dried over sodium and distilled) was used as the solvent in this run.

After addition of the catalyst and cyclohexane to the reactor, ethylene was added to the reactor until a pressure of about 200 p.s.i.g. was reached. The reactor was then heated to a temperature between 390 and 400° F. and was maintained at this temperature for a period of 15 hours and 30 minutes.

At the end of the period the pressure was 150 p.s.i.g. The reactor was then repressured to about 500 p.s.i.g. and allowed to cool. A solid polymer was present when the reactor was opened. The polymer was treated with 400 milliliters of isopropyl alcohol and permitted to stand overnight. The solid polymer was stirred in a Waring Blendor with 200 milliliters of water containing 5 grams of sodium, filtered and again treated with water in the Waring Blendor. After filtering the polymer was dried for twelve hours at 70° C. and 30 inches mercury vacuum. About 15 grams of white solid polymer was recovered.

The properties of a compression mold sample of this ethylene polymer are presented in Table II.

Table II

| | |
|---|---|
| Inherent viscosity | 0.259. |
| Molecular weight (based on inherent viscosity | 49,000. |
| Melting point | 247±2° F. |
| Density, grams/cc. | 0.972. |
| Flexibility | Good. |
| Color | Brown. |

EXAMPLE III

Ethylene was polymerized in the same equipment and using the same general procedure as described in Example I. In this run the catalyst consisted of 2.6 grams of titanium butoxide and a mixture of 2.6 grams of anhydrous aluminum chloride and 2.76 grams of sodium (finely cut and washed with purified cyclohexane). About 400 milliliters of cyclohexane (dried over sodium and distilled) was used as the solvent in this run.

After addition of the catalyst and cyclohexane to the reactor, ethylene was added until a pressure of approximately 200 p.s.i.g. was reached with the temperature of the reactor and contents at 85° F. Heating was initiated and at the end of 2 hours the temperature had increased to 260° F. and the pressure had increased to approximately 400 p.s.i.g. At the end of an additional 25 minutes, the temperature had increased to 300° F. with the pressure remaining at about 400 p.s.i.g. Heating was continued and at the end of an additional 1 hour and 5 minutes, the temperature had increased to 325° F. with the pressure remaining at about 400 p.s.i.g. At this point the reactor was repressured with ethylene to about 500 p.s.i.g. At the end of an additional 1 hour and 25 minutes' heating, the temperature had increased to 370° F. and the pressure had increased to about 575 p.s.i.g. The temperature of the reactor and contents was then controlled at a temperature between about 370 and 375° F. for the remainder of the run. During the next 6 hours and 5 minutes, with the temperature controlled at about 375° F., the pressure dropped to 250 p.s.i.g. At this point the reactor was repressured with ethylene to 600 p.s.i.g. The reaction was allowed to continue for an additional 2 hours at which time the heating was discontinued. The reactor was allowed to cool for an additional 8 hours and at the end of this period the temperature was about 150° F. and the pressure about 250 p.s.i.g. After venting the ethylene, the reactor was opened and a slurry of solid polymer in the solvent was present. It appeared that some particles of unreacted sodium were also present in the reaction mixture. About 400 milliliters of methyl alcohol was added to the mixture in the reactor. This material was then transferred from the reactor to a Waring Blendor where the polymer was finely ground. The liquid was filtered from the finely divided polymer, and the polymer was dried in a vacuum oven at approximately 80° C.

EXAMPLE IV

Ethylene was polymerized in the same equipment and using the same general procedure as described in Example I. In this run the catalyst consisted of 1.3 grams of titanium potassium oxalate and a mixture of 2.6 grams of anhydrous aluminum chloride and 2.08 grams of aluminum powder. The titanium potassium oxalate which was obtained from Fisher Scientific Company of Pittsburgh, Pennsylvania, in the form of the dihydrate was heated for 4 hours at about 110° C. before being used in the polymerization run. The sample used was weighed after drying. About 400 milliliters of cyclohexane (dried over sodium and distilled) was used as the solvent in this run.

After charging the catalyst and cyclohexane, the reactor was pressured with ethylene to approximately 200 p.s.i.g. at 80° F. The reactor and contents were heated gradually for a period of about 3 hours, at the end of which time a temperature of about 390° F. had been reached. Heating was continued for about 47 hours and 10 minutes with the temperature being controlled at 390° F. No additional ethylene was added to the reactor during this heating period. At the end of this heating period, heating was discontinued and the reactor allowed to cool to room temperature. After about 4 hours, the ethylene was vented and the reactor was opened. Approximately 400 milliliters of isopropyl alcohol was added to the reactor contents. A polymer of ethylene, which was white and fibrous, was observed in the reaction mixture. This mixture was stirred in a Waring Blendor for about 15 minutes and then the finely divided polymer was separated from the liquid by filtration. The polymer was dried in a vacuum oven at about 85 C. and 30 inches of mercury vacuum for about 12 hours. About 7 grams of a grayish, finely divided solid polymer of ethylene was obtained.

The physical properties of a compression molded sample of this ethylene polymer are presented in Table III.

Table III

| | |
|---|---|
| Melting point, ° F. | 243±3. |
| Density, grams/cc. | 1.08. |
| Inherent viscosity | 0.624. |
| Molecular weight (based on inherent viscosity) | 15,250. |
| Color | Deep brown. |

The polymers and copolymers produced in accordance with this invention have utility in applications where solid plastics are used. They can be molded to form articles of any desired shape, such as bottles and other containers for liquids. Also, they can be formed into pipe by extrusion.

As will be evident to those skilled in the art, many variations and modifications can be practiced within the scope of the disclosure and claims of this invention. The invention resides in an improved polymerization process for olefins as described herein comprising the use of a novel catalyst composition and the polymers so produced, said catalyst composition comprising at least one Group IV-A metal derivative as defined herein and at least one member selected from the group consisting of (a) a mixture of an organic halide and at least one free metal selected from the group consisting of sodium, potassium, lithium, rubidium, cesium, beryllium, magnesium, zinc, cadmium, mercury, aluminum, gallium, indium and thallium; and (b) a mixture of aluminum chloride and at least one free metal selected from the group consisting of sodium, potassium, lithium, rubidium, cesium, beryllium, magnesium, zinc, cadmium, mercury, aluminum, gallium, indium and thallium.

I claim:

1. A catalyst composition consisting essentially of a mixture of titanium potassium oxalate, aluminum chloride and elemental aluminum, the ratio of the amount of materials in said catalyst composition being in the range of 0.02 to 50 mols of said aluminum chloride per mol of said titanium potassium oxalate and in the range of 0.02 to 50 mols of said aluminum per mol of said titanium potassium oxalate.

2. A catalyst composition consisting essentially of a mixture of titanium butoxide, aluminum chloride and elemental aluminum, the ratio of the amount of materials in said catalyst composition being in the range of 0.02 to 50 mols of said aluminum chloride per mol of said titanium butoxide and in the range of 0.02 to 50 mols of said aluminum per mol of said titanium butoxide.

3. A catalyst composition consisting essentially of a mixture of titanium butoxide, ethyl bromide and elemental aluminum, the ratio of the amount of materials in said catalyst composition being in the range of 0.02 to 50 mols of said ethyl bromide per mol of said titanium butoxide and in the range of 0.02 to 50 mols of said aluminum per mol of said titanium butoxide.

4. A catalyst composition consisting essentially of a mixture of titanium butoxide, aluminum chloride and elemental sodium, the ratio of the amount of materials in said catalyst composition being in the range of 0.02 to 50 mols of said elemental sodium per mol of said titanium butoxide and in the range of 0.02 to 50 mols of said elemental sodium per mol of said titanium butoxide.

5. A method for polymerizing an aliphatic 1-olefin having up to and including 8 carbon atoms per molecule which comprises contacting said olefin with a catalyst selected from the group consisting of (A) a catalyst comprising the reaction product obtained by mixing (a) a compound corresponding to the formula $M(OR)_m$, wherein M is selected from the group consisting of titanium and zirconium, R is an alkyl radical containing from 1 to 20 carbon atoms and said compound contains up to a total of 50 carbon atoms, and $m$ is equal to the valence of the metal M, and a component selected from the group consisting of (b) a mixture of a halogenated hydrocarbon and a metal selected from the group consisting of aluminum and sodium, and (c) a mixture of aluminum chloride and a metal selected from the group consisting of aluminum and sodium, and (B) a catalyst comprising the reaction product obtained by mixing (1) a complex salt of oxalic acid, a metal selected from the group consisting of titanium and zirconium, and an alkali metal, and (2) a mixture of aluminum chloride and a metal selected from the group consisting of aluminum and sodium, the ratio of the amount of said $M(OR)_m$ compound and said components (b) and (c) in said catalyst (A) being in the range of 0.02 to 50 mols of said halogenated hydrocarbon and from 0.02 to 50 mols of said metal in said component (b) per mol of said $M(OR)_m$ compound, and from 0.02 to 50 mols of said aluminum chloride and from 0.02 to 50 mols of said metal in said component (c) per mol of said $M(OR)_m$ compound, and the ratio of the amount of said complex salt and said component (2) in said catalyst (B) being in the range of 0.02 to 50 mols of said aluminum chloride and from 0.02 to 50 mols of said metal per mol of said complex salt.

6. A method for polymerizing an aliphatic 1-olefin having up to and including 8 carbon atoms per molecule which comprises contacting said olefin with a catalyst selected from the group consisting of (A) a catalyst comprising the reaction product obtained by mixing (a) a compound corresponding to the formula $M(OR)_m$, wherein M is selected from the group consisting of titanium and zirconium, R is an alkyl radical containing from 1 to 20 carbon atoms and said compound contains up to a total of 50 carbon atoms, and $m$ is equal to the valence of the metal M, and a component selected from the group consisting of (b) a mixture of a halogenated hydrocarbon and a metal selected from the group consisting of aluminum and sodium, and (c) a mixture of aluminum chloride and a metal selected from the group consisting of aluminum and sodium, and (B) a catalyst comprising the reaction product obtained by mixing (1) a complex salt of oxalic acid, a metal selected from the group consisting of titanium and zirconium, and an alkali metal, and (2) a mixture of aluminum chloride and a metal selected from the group consisting of aluminum and sodium, the ratio of the amount of said $M(OR)_m$ compound and said components (b) and (c) in said catalyst (A) being in the range of 0.02 to 50 mols of said halogenated hydrocarbon and from 0.02 to 50 mols of said metal in said component (b) per mol of said $M(OR)_m$ compound, and from 0.02 to 50 mols of said aluminum chloride and from 0.02 to 50 mols of said metal in said component (c) per mol of said $M(OR)_m$ compound, and the ratio of the amount of said complex salt and said component (2) in said catalyst (B) being in the range of 0.02 to 50 mols of said aluminum chloride and from 0.02 to 50 mols of said metal per mol of said complex salt, at a temperature in the range of from zero to 500° F., in the presence of a hydrocarbon diluent, inert and liquid under conditions of the method, at a pressure sufficient to maintain said diluent in liquid phase; and recovering the solid polymer so produced.

7. A catalyst composition selected from the group consisting of (A) a catalyst comprising the reaction product obtained by mixing (a) a compound corresponding to the formula $M(OR)_m$, wherein M is selected from the group consisting of titanium and zirconium, R is an alkyl radical containing from 1 to 20 carbon atoms and said compound contains up to a total of 50 carbon atoms, and $m$ is equal to the valence of the metal M, and a component selected from the group consisting of (b) a mixture of a halogenated hydrocarbon and a metal selected from the group consisting of aluminum and sodium, and (c) a mixture of aluminum chloride and a metal selected from the group consisting of aluminum and sodium, and (B) a catalyst comprising the reaction product obtained by mixing (1) a complex salt of oxalic acid, a metal selected from the group consisting of titanium and zirconium, and an alkali metal, and (2) a mixture of aluminum chloride and a metal selected from the group consisting of aluminum and sodium, the ratio of the amount of said $M(OR)_m$ compound and said components (b) and (c) in said catalyst (A) being in the range of 0.02 to 50 mols of said halogenated hydrocarbon and from 0.02 to 50 mols of said metal in said component (b) per mol of said $M(OR)_m$ compound, and from 0.02 to 50 mols of said aluminum chloride and from 0.02 to 50 mols of said metal in said component (c) per mol of said $M(OR)_m$ compound, and the ratio of the amount of said complex salt and said component (2) in said catalyst (B) being in the range of 0.02 to 50 mols of said aluminum chloride and from 0.02 to 50 mols of said metal per mol of said complex salt.

8. A method for polymerizing ethylene which comprises contacting ethylene with a catalyst consisting essentially of a mixture of titanium potassium oxalate, aluminum chloride and elemental aluminum, the ratio of the amount of materials in said catalyst being in the range of 0.02 to 50 mols of said aluminum chloride per mol of said titanium potassium oxalate and in the range of 0.02 to 50 mols of said aluminum per mol of said titanium potassium oxalate.

9. A method for polymerizing ethylene which comprises contacting ethylene with a catalyst consisting essentially of a mixture of titanium butoxide, aluminum chloride and elemental aluminum, the ratio of the amount of materials in said catalyst being in the range of 0.02 to 50 mols of said aluminum chloride per mol of said titanium butoxide and in the range of 0.02 to 50 mols of said aluminum per mol of said titanium butoxide.

10. A method for polymerizing ethylene which comprises contacting ethylene with a catalyst consisting essentially of a mixture of titanium butoxide, ethyl bromide and elemental aluminum, the ratio of the amount of materials in said catalyst being in the range of 0.02 to 50 mols of said ethyl bromide per mol of said titanium butoxide and in the range of 0.02 to 50 mols of said aluminum per mol of said titanium butoxide.

11. A method for polymerizing ethylene which comprises contacting ethylene with a catalyst consisting essentially of a mixture of titanium butoxide, aluminum chloride and elemental sodium, the ratio of the amount of materials in said catalyst being in the range of 0.02 to 50 mols of said aluminum chloride per mol of said titanium butoxide and in the range of 0.02 to 50 mols of said sodium per mol of said titanium butoxide.

12. A method for polymerizing an aliphatic 1-olefin having from 2 to 8 carbon atoms per molecule to a solid polymer which comprises contacting said olefin with a catalyst consisting essentially of (A) a titanium alkoxide wherein each alkoxide group contains 1–18 carbon atoms, (B) metallic aluminum, and (C) aluminum chloride, the ratio of component (B) to component (A) being from 0.02 to 50 mols of said (B) to 1 mol of said (A) and the ratio of component (C) to component (A) being from .02 to 50 mols of said (C) to 1 mol of said (A).

References Cited in the file of this patent

UNITED STATES PATENTS

| | | |
|---|---|---|
| 2,822,357 | Brebner et al. | Feb. 4, 1958 |
| 2,846,427 | Findlay | Aug. 5, 1958 |
| 2,862,917 | Anderson et al. | Dec. 2, 1958 |
| 2,905,645 | Anderson et al. | Sept. 22, 1959 |

FOREIGN PATENTS

| | | |
|---|---|---|
| 874,215 | Germany | Apr. 20, 1953 |
| 534,792 | Belgium | May 1, 1955 |
| 526,101 | Italy | May 14, 1955 |